United States Patent
Haddad

(10) Patent No.: US 9,059,643 B2
(45) Date of Patent: Jun. 16, 2015

(54) SWITCHING CONFIGURATION AND METHOD FOR THE PRODUCTION OF AN ALTERNATING VOLTAGE FROM AT LEAST SUPPLY TERMINALS WITH TEMPORALLY VARIABLE OUTPUT DC VOLTAGE

(75) Inventor: Kevork Haddad, Newark Valley, NY (US)

(73) Assignee: Semikron Elektronik GmbH & Co., Nürnberg (DE)

( * ) Notice: Subject to any disclaimer, the term of this patent is extended or adjusted under 35 U.S.C. 154(b) by 1015 days.

(21) Appl. No.: 13/107,600

(22) Filed: May 13, 2011

(65) Prior Publication Data

US 2011/0304214 A1    Dec. 15, 2011

Related U.S. Application Data

(60) Provisional application No. 61/334,402, filed on May 13, 2010.

(51) Int. Cl.
*H02J 1/00* (2006.01)
*H02J 3/00* (2006.01)
*H02M 7/5387* (2007.01)
*H02M 3/158* (2006.01)
*H02J 3/38* (2006.01)
*H02M 1/00* (2006.01)

(52) U.S. Cl.
CPC .............. *H02M 7/5387* (2013.01); *H02J 3/383* (2013.01); *H02M 3/1584* (2013.01); *H02M 2001/007* (2013.01); *Y02E 10/563* (2013.01)

(58) Field of Classification Search
CPC ............. H02J 3/383; H02J 1/102; H02J 3/00; Y02E 10/563; Y02E 10/58; Y02E 10/52; Y02E 10/56; Y02E 10/763; Y02E 10/50
USPC .......................................................... 307/82
See application file for complete search history.

(56) References Cited

U.S. PATENT DOCUMENTS

| | | | |
|---|---|---|---|
| 2008/0304298 A1* | 12/2008 | Toba et al. | 363/56.01 |
| 2010/0019754 A1 | 1/2010 | Schreiber | |
| 2010/0141041 A1* | 6/2010 | Bose et al. | 307/82 |

FOREIGN PATENT DOCUMENTS

DE    10 2008 034 955    2/2010

* cited by examiner

*Primary Examiner* — Carlos Amaya
(74) *Attorney, Agent, or Firm* — The Law Offices of Roger S. Thompson

(57) ABSTRACT

A circuit having a plurality of parallel-connected partial circuits for feeding an inverter circuit. A partial circuit comprises an unregulated voltage source with a temporally variable output DC voltage and a synchronous converter having an automatically functioning regulating circuit. The circuit is triggered according to two modes of operation. The first mode of operation is as an upward converter, when the value of the output voltage of the unregulated voltage source exceeds a threshold value, and thus the inverter circuit is supplied with the requisite input voltage. The second mode of operation is as a downward converter, when the value of an output voltage of the unregulated voltage source is below a threshold value, or when there is no output voltage from the unregulated voltage source, in which case a first capacitor is charged from the DC voltage applied to the second terminals.

11 Claims, 2 Drawing Sheets

US 9,059,643 B2

SWITCHING CONFIGURATION AND METHOD FOR THE PRODUCTION OF AN ALTERNATING VOLTAGE FROM AT LEAST SUPPLY TERMINALS WITH TEMPORALLY VARIABLE OUTPUT DC VOLTAGE

RELATED APPLICATIONS

This application claims priority from U.S. Provisional Patent Application Ser. No. 61/334,402 which was filed on May 13, 2010.

BACKGROUND OF THE INVENTION

1. Field of the Invention

The invention is directed to a circuit for generating an alternating voltage from a plurality of unregulated voltage sources with an output DC voltage that is variable over time, and a method for triggering the circuit. Photovoltaic arrays or parts of such arrays are preferred as such unregulated voltage sources. The term photovoltaic array should be understood here to mean solely the configuration and electrical connection of a plurality of photovoltaic modules. Such photovoltaic modules are connected to make photovoltaic arrays and have a structurally dictated output DC voltage that is dependent on the amount of incident sunlight and that is accordingly slowly variable over time.

2. Description of the Related Art

To feed the output current of a photovoltaic array such as described into the public power grid or a local power grid, the output DC voltage of the array must be converted by means of an inverter circuit into an alternating voltage of constant frequency and voltage.

One example of a circuit arrangement for generating such an alternating voltage is described in German patent disclosure DE 10 2008 034 955 A1. That disclosure describes a current converter having a photovoltaic array with an output voltage that is temporally variable, a level converter, and an inverter. In the associated method, first and second capacitors of the level converter are each charged with half the value of the desired intermediate circuit voltage, regardless of the input voltage.

Many demands are made of such circuit arrangements, depending on the intended use, and some of these demands are contradictory. For example, the input voltage at the inverter circuit should be as constant as possible, and the transmission from the photovoltaic array to the inverter circuit should be done at as high a voltage as possible to keep line losses low. The entire circuit should also operate at high efficiency. At the same time, the photovoltaic array, or its photovoltaic modules, should be operated in such a way that it operates at the MPP (maximum power point). This requires suitable regulation, known as MPP tracking.

SUMMARY OF THE INVENTION

It is an object of the invention to provide a circuit with at least one partial circuit having an upward converter function, and which has a feeding, unregulated voltage source, as well as a method for triggering it, in which, when a threshold value of the output voltage of the unregulated voltage source is reached, the partial circuit activates the upward converter function automatically, without a switching command from a higher-order control logic unit.

The inventive circuit includes one or more parallel-connected partial circuits for feeding at least one inverter circuit that is connectable to an associated power grid. Each partial circuit comprises an unregulated voltage source having an output DC voltage that varies over time, a synchronous converter (buck-boost inverter) having a first capacitor connected between first terminals of a switching stage and a series circuit of second capacitors at their second terminals, a DC voltage source, and a regulating circuit for triggering the synchronous converter.

Furthermore, at least one coil is provided in at least one lead line between the first capacitor and the first terminals of the switching stage of the synchronous converter. The DC voltage source supplies the regulating circuit and is itself preferably supplied from the first capacitor or from one of the two second capacitors, to which end these capacitors are suitably connected to the DC voltage source. Alternatively, and for a redundant feature that enhances operational safety, this DC voltage source has two partial DC voltage sources, which for their respective supply are connected to the first capacitor and to one of the second capacitors, respectively.

The regulating circuit in turn preferably has a plurality of measuring devices for measuring the voltage and current at the output of the unregulated voltage source, the current at the first terminals of the switching stage of the synchronous converter, and the voltage at the second capacitors and thus the output voltage of the partial circuit.

The switching stage of the synchronous converter of the circuit arrangement of the invention preferably comprises at least one converter stage, which in turn comprises a series circuit of four power transistors, each with an antiparallel-connected diode. The first power transistor is connected to the second terminal of positive polarity; the center point between the first and second transistors is connected to the first terminal of positive polarity; the center point between the third and fourth transistors is connected to the first terminal of negative polarity; and the fourth transistor is connected to the second terminal of negative polarity. It is also preferable for the center point between the second and third transistors to be connected to the center point of the series circuit of the second capacitors.

The inverter circuit, may be in any known form, but is, preferably in the form of three-phase inverters. It is especially preferable to connect two three-phase inverters in parallel and trigger them with an offset of one-half of a switching period. The result is an advantageous nearly sinusoidal course of current and voltage at the output of the inverter circuit, and the inverter circuit can in turn be connected to the power grid, either directly or by means of a transformer.

The associated method according to the invention for triggering such a circuit has, besides the standby state in which only monitoring functions are active, two further alternative modes of operation for each partial circuit; the function of each of these modes of operation depends on the value of the output voltage of the unregulated voltage source of the particular partial branch.

If the value of the output voltage of the unregulated voltage source is above a threshold, the synchronous converter is operated as an upward converter and thus charges the second capacitors and applies a set-point value, preferably pre-determined and stored in memory in the trigger circuit, to the outputs of the synchronous converter. A plurality of identical partial circuits may thus be connected in parallel, since all the active partial circuits have the same output voltage, without the need for a higher-order logical control unit.

If the value of the output voltage of the unregulated voltage source is below the threshold value, and if the first capacitor is not virtually fully charged, the synchronous converter is operated as a downward converter and thus charges the first capacitor, for instance from the power grid. To that end, the inverter furnishes a DC voltage to the second terminals of the switching stage of the synchronous converter, which from this, in the downward converter mode of operation, applies the requisite voltage to the first capacitor.

From the second mode of operation mentioned, or also from the standby state with the charged first capacitor, the trigger circuit switches the synchronous converter directly into the first mode of operation mentioned, as soon as the threshold value is exceeded. This switchover can be done automatically, since the requisite measuring devices for measuring the voltage and current of the unregulated voltage source are active at all times by the trigger circuit fed from the DC voltage source.

The DC voltage source in turn is charged continuously or discontinuously by means of the first capacitor and/or a second capacitor and can thus supply the trigger circuit of the synchronous converter at any time. In addition, if the unregulated voltage source is a photovoltaic array, the trigger circuit can perform the MPP tracking of this photovoltaic array.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
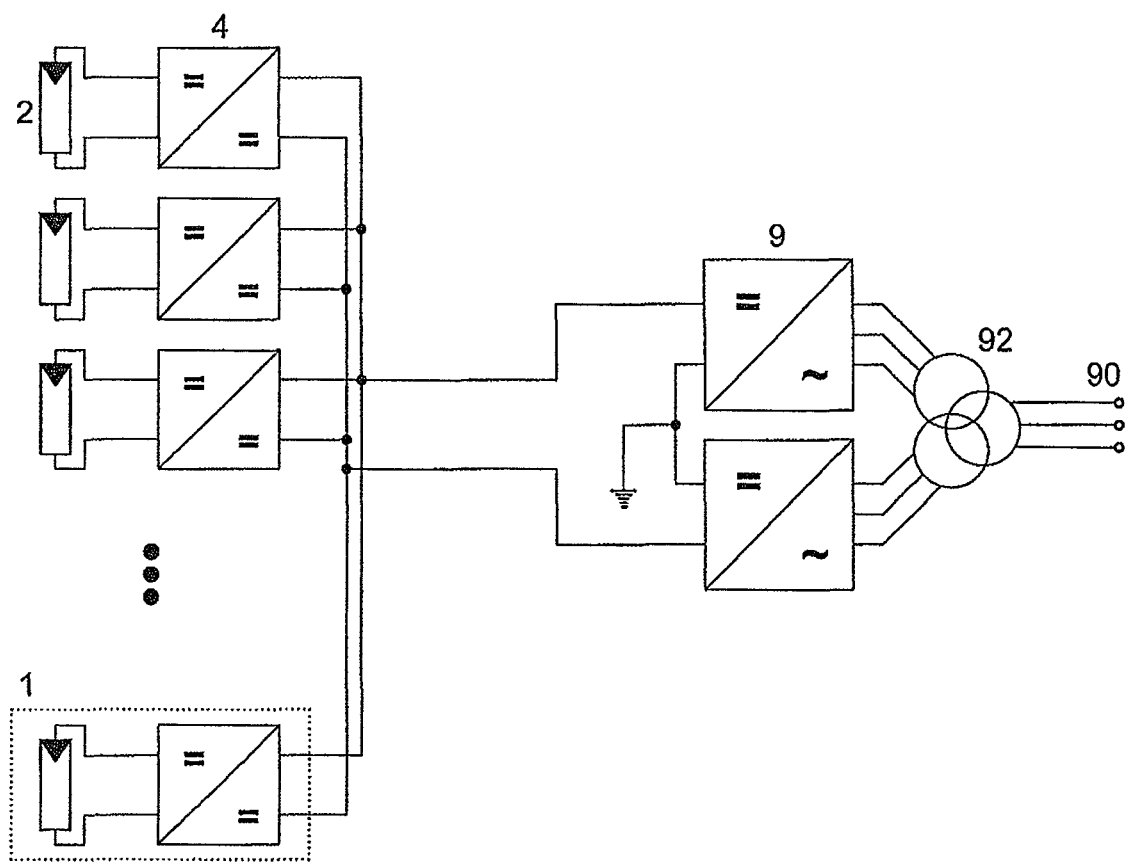
FIG. 1 shows the fundamental principle of a first circuit of the invention.

FIG. 1 shows the fundamental principle of a first circuit arrangement of the invention. To that end, a plurality of partial circuits 1 is shown. Each partial circuit 1 comprises an unregulated voltage source 2, in this case a photovoltaic array, and a synchronous converter, also known as a "buck-boost" inverter. Photovoltaic array 2 comprises a plurality of photovoltaic modules and has a typical output voltage, which it is understood is dependent on incident sunlight, of between several hundred and nearly a thousand volts.

Synchronous converter 4 is connected to photovoltaic array 2 and has the primary task of increasing the variable output voltage of photovoltaic array 2 so that an inverter circuit 9 connected to synchronous converter 4 has an input voltage that is identical to the output voltage; this ensures the most efficient possible operation of inverter circuit 9. Inverter circuit 9 itself is designed as in the prior art, in this case as a parallel circuit of two three-phase inverters with a grounded center point. This is merely an example, and the invention is not limited to this embodiment. The inverter circuit is furthermore typically connected by means of a suitable transformer 92 to a power grid 90 that is to be fed.

Advantageously, a plurality of partial circuits 1 connected in parallel with one another make one complete circuit in accordance with the invention. It is understood that it is essential here that synchronous converter 4 of partial circuit 1, makes the same output voltage available in each case even if the voltage of photovoltaic arrays 2 supplying them differs.

Figure 2:
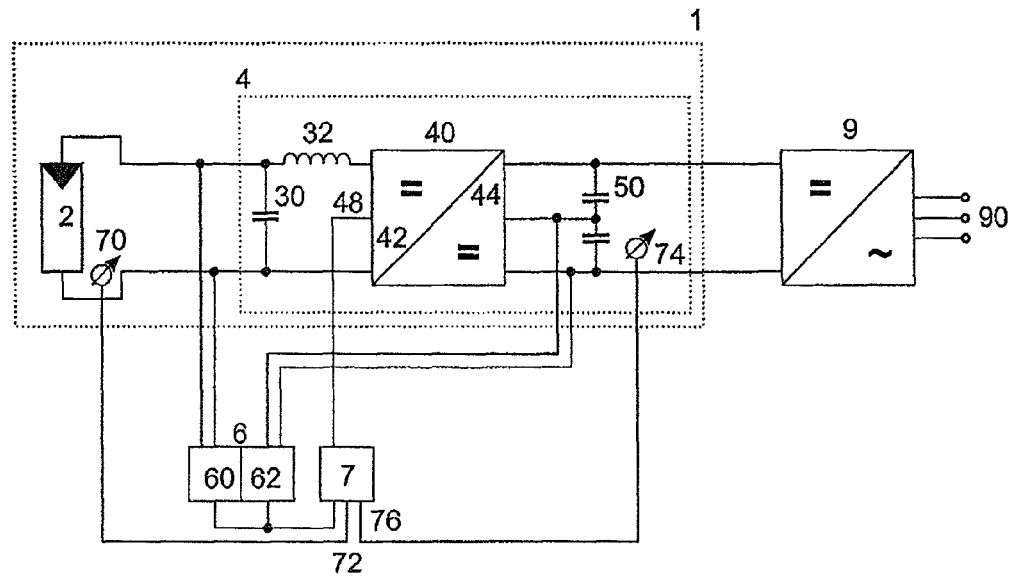
FIG. 2 shows essential components of a second circuit of the invention.

FIG. 2 shows essential components of a second embodiment of the inventive circuit. Analogously to FIG. 1, what is shown is again a photovoltaic array 2 as an unregulated voltage source, which is connected to a synchronous converter 4 that in turn comprises a first capacitor 30, a coil 32, a switching stage 40, and a series circuit of second capacitors 50. First capacitor 30 is connected between the terminals 42 of switching stage 40 and is thus connected to the outputs of photovoltaic array 2. Coil 32 is provided between first capacitor 30 and one of the first terminals 42 of switching stage 40, in this case to the one having the positive polarity. The output of synchronous converter 4 is connected to an inverter circuit 9, which in turn is connected to the power grid 90 that is to be fed.

A regulating circuit 7 is also shown, for automatic triggering of synchronous converter 4. To that end, regulating circuit 7 has first measuring devices 70 for measuring the output voltage and the output current of photovoltaic array 2, as well as second measuring devices 74 for determining the voltage at second capacitors 50.

A DC voltage source 6 supplies energy to regulating circuit 7, DC voltage source 6 is fed from either first capacitor 30 or one of second capacitors 50. The synchronous converter 4 can operate in the downward converter mode of operation to supply the DC voltage source 6 from first capacitor 30. Synchronous converter 4 can thus reduce the voltage of the connecting line to inverter circuit 9, which is applied to second terminals 44 of switching stage 40 and can be fed from power grid 90 by inverter circuit 9 in a rectifier mode of operation, up to the allowed voltage value of first capacitor 30. However, it is preferable if, as shown here, DC voltage source 6 is embodied in redundant form with two partial DC voltage sources 60, 62, where each DC voltage source 60, 62 is fed in one of the ways described.

In this embodiment of the inventive circuit, it is especially advantageous that, since it can function automatically, it does not require a connection to a higher-order control logic unit. This means that photovoltaic array 2 is monitored by regulating circuit 7 fed from DC voltage source 6, and given adequate voltage at the outputs of photovoltaic array 2. Synchronous converter 4 changes to the upward converter mode of operation and makes the requisite output voltage available.

Figure 3:
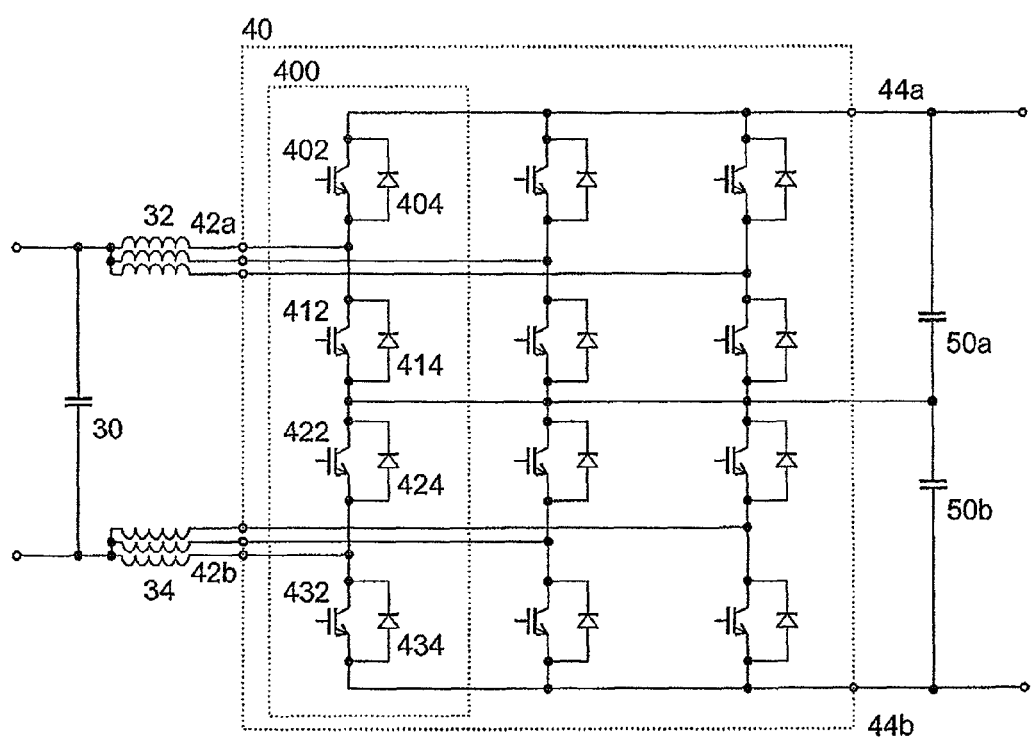
FIG. 3 shows some components of the circuit of FIG. 2, in further detail.

FIG. 3 shows some components of the circuit of FIG. 2 in further detail. Here, synchronous converter 4 is shown embodied with a switching stage 40 with three identical, parallel-connected, converter stages 400. Each converter stage 400 comprises a series circuit of four power transistors 402, 412, 422, 432, each with a respective antiparallel-connected diode 404, 414, 424, 434. First power transistor 402 is connected to the second terminal 44a of positive polarity; the center point between first power transistor 402 and second transistor 412 is connected to a first terminal 42a of positive polarity; the center point between third transistor 422 and fourth transistor 432 is connected to a first terminal 42b of negative polarity; and fourth transistor 432 is connected to second terminal 44b of negative polarity.

The three first terminals 42 a/b of positive and negative polarity of switching stage 40 are associated here with the three converter stages 400 and each of them has its own coil 32, 34. Typically, each of these coils 32, 34 has its own core, but, to attain coupling effects, it may also be preferable to provide all the coils 32, 34 associated with the various polarities on the same core.

The two second terminals 44 a/b of the switching stage 40 are connected to the parallel circuit of second capacitors 50

$a/b$, and the center point of this parallel circuit is connected to the center points of various converter stages 400.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A circuit, having at least one partial circuit for feeding at least one inverter circuit that is connectable to a power grid, wherein each partial circuit comprises:
    an unregulated voltage source having a temporally variable output DC voltage;
    a synchronous converter having a first capacitor, connected between the first terminals of a switching stage of said synchronous converter and a series circuit of second capacitors at their second terminals; and
    in at least one lead line between said first capacitor and said first terminals, at least one coil having a DC voltage source for supplying a regulating circuit for triggering said synchronous converter with a plurality of measuring devices;
    wherein
    said switching stage of said synchronous converter comprises at least one converter stage which includes a series circuit of first, second, third and fourth power transistors, each with one anti-parallel-connected diode, in which said first power transistor is connected to a second terminal of positive polarity; a center point between said first power transistor and said second power transistor is connected to a first terminal of positive polarity; a center point between a third power transistor and said fourth power transistor is connected to a first terminal of negative polarity; and said fourth power transistor is connected to a second terminal of negative polarity.

2. The circuit of claim 1, wherein
    there are at least two converter stages, each having an associated coil disposed on its own core.

3. The circuit of claim 1, wherein
    there are at least two converter stages, each having an associated coil, and each said coil is coupled on a common core.

4. The circuit of claim 1, wherein
    the center point between said second power transistor and said third power transistor is connected to a center point between said second capacitors.

5. The circuit of claim 1, wherein
    said DC voltage source, for its supply, is connected to said first capacitor.

6. The circuit of claim 1, wherein
    said DC voltage source, for its supply, is connected to one of said second capacitors.

7. The circuit of claim 1, wherein
    said DC voltage source is embodied redundantly and, for its supply, is connected to said first capacitor and one of said second capacitors.

8. The circuit of claim 1, wherein there are at least two partial circuits, and said at least two partial circuits are connected in parallel.

9. A method for triggering a circuit, the circuit having at least one partial circuit for feeding at least one inverter circuit that is connectable to a power grid, wherein each partial circuit comprises:
    an unregulated voltage source having a temporally variable output DC voltage;
    a synchronous converter having a first capacitor, connected between the first terminals of a switching stage of said synchronous converter and a series circuit of second capacitors at their second terminals; and
    in at least one lead line between said first capacitor and said first terminals, at least one coil having a DC voltage source for supplying a regulating circuit for triggering said synchronous converter with a plurality of measuring devices;
    wherein said synchronous converter has at least two modes of operation:
    a first mode of operation as an upward converter, when the value of the output voltage of said unregulated voltage source exceeds a threshold value, and said inverter circuit is thus supplied with the necessary input DC voltage; and
    a second mode of operation as a downward converter, when the value of an output voltage of the unregulated voltage source is one of below a threshold value and when no output voltage from said unregulated voltage source is present, in which case said first capacitor is charged from the DC voltage applied to said second terminal;
    wherein in both modes of operation, said DC voltage source is charged by at least one of said first capacitor and one of said second capacitors and in turn supplies said regulating circuit, and thus on attaining the threshold value said synchronous converter switches over automatically and directly from said second mode of operation to said first mode of operation.

10. The method of claim 9, further comprising the step of regulating said mode of operation of said synchronous converter by means of said measuring the voltage and the current at the output of said unregulated voltage source and the voltage at at least one of said two second capacitors are measured.

11. The method of claim 10, further comprising the step of regulating the MPP tracking of an unregulated voltage source equipped as a photovoltaic array.

* * * * *